(12) United States Patent  
Larsen (10) Patent No.: US 7,658,366 B2  
(45) Date of Patent: Feb. 9, 2010

(54) HIGH-PRESSURE BI-DIRECTIONAL VALVE

(75) Inventor: Todd W. Larsen, Milaca, MN (US)

(73) Assignee: Tescom Corporation, Elk River, MN (US)

( * ) Notice: Subject to any disclaimer, the term of this patent is extended or adjusted under 35 U.S.C. 154(b) by 139 days.

(21) Appl. No.: 11/753,273

(22) Filed: May 24, 2007

(65) Prior Publication Data

US 2008/0290313 A1    Nov. 27, 2008

(51) Int. Cl.  
    *F16K 39/00*    (2006.01)
(52) U.S. Cl. .................. 251/282; 251/63.5; 251/63.6
(58) Field of Classification Search ............ 251/63, 251/63.5, 63.6, 281, 282, 62  
See application file for complete search history.

(56) References Cited

U.S. PATENT DOCUMENTS

| | | | |
|---|---|---|---|
| 6,422,531 B1 * | 7/2002 | Sich ...................... | 251/63.6 |
| 6,488,258 B1 * | 12/2002 | Dantlgraber et al. ...... | 251/63.6 |
| 6,691,980 B2 * | 2/2004 | Larsen et al. .......... | 251/129.04 |
| 6,986,362 B2 * | 1/2006 | Cheong ................ | 137/491 |

2006/0197049 A1    9/2006    Hamada et al.

FOREIGN PATENT DOCUMENTS

| | | |
|---|---|---|
| DE | 41 29 774 A1 | 3/1993 |
| JP | 2006318339 | 11/2006 |

OTHER PUBLICATIONS

International Search Report for PCT/US2008/063949 dated Aug. 29, 2008.

* cited by examiner

*Primary Examiner*—John K Fristoe, Jr.  
(74) *Attorney, Agent, or Firm*—Marshall, Gerstein & Borun LLP (57) ABSTRACT

A control element of a bi-directional valve is in fluid communication with an outlet pressure and an inlet pressure when the valve is closed such that a sum of the forces applied to the control element result in a net force urging the control element to seat against a valve seat. The valve includes a valve body carrying the valve seat. The control element is balanced on an outlet side of the valve seat such that the outlet pressure applies approximately no net force to the control element. In contrast, the control element is unbalanced on an inlet side of the valve seat such that inlet pressure applies a net force on the control element to bias the control to seat against the valve seat.

32 Claims, 4 Drawing Sheets

FIG. 4

HIGH-PRESSURE BI-DIRECTIONAL VALVE

FIELD OF THE INVENTION

The present invention generally relates to bi-directional air-operated valves, and more particularly, to high-pressure bi-directional air-operated valves.

BACKGROUND

Plants and factories utilize process control devices to control the flow of fluids in processes, wherein "fluids" may include liquids, gases, or any mixture that can flow through a pipe. Manufacturing processes that create consumer articles or goods such as fuel, food, and clothes require control valves to control and regulate fluid flow. Even a medium sized factory may utilize hundreds of control valves to control a process. Control valves have been utilized for over a century, during, which time valve designers have continuously improved the operational performance of control valves.

When designing a process, the designer is faced with many design requirements and design constraints. For example, some process control applications require a valve to enable flow in two directions, which are often called bi-directional flow valves. Another example of a design constraint includes the pressure at which the fluid will be operating within the process. For example, some processes operate at relatively low pressures, e.g., less than approximately 10,000 pounds per square inch gauge (psig), while other processes may operate at relatively high pressures, e.g., greater than 10,000 psig, and up to approximately 20,000 psig.

Figure 1:
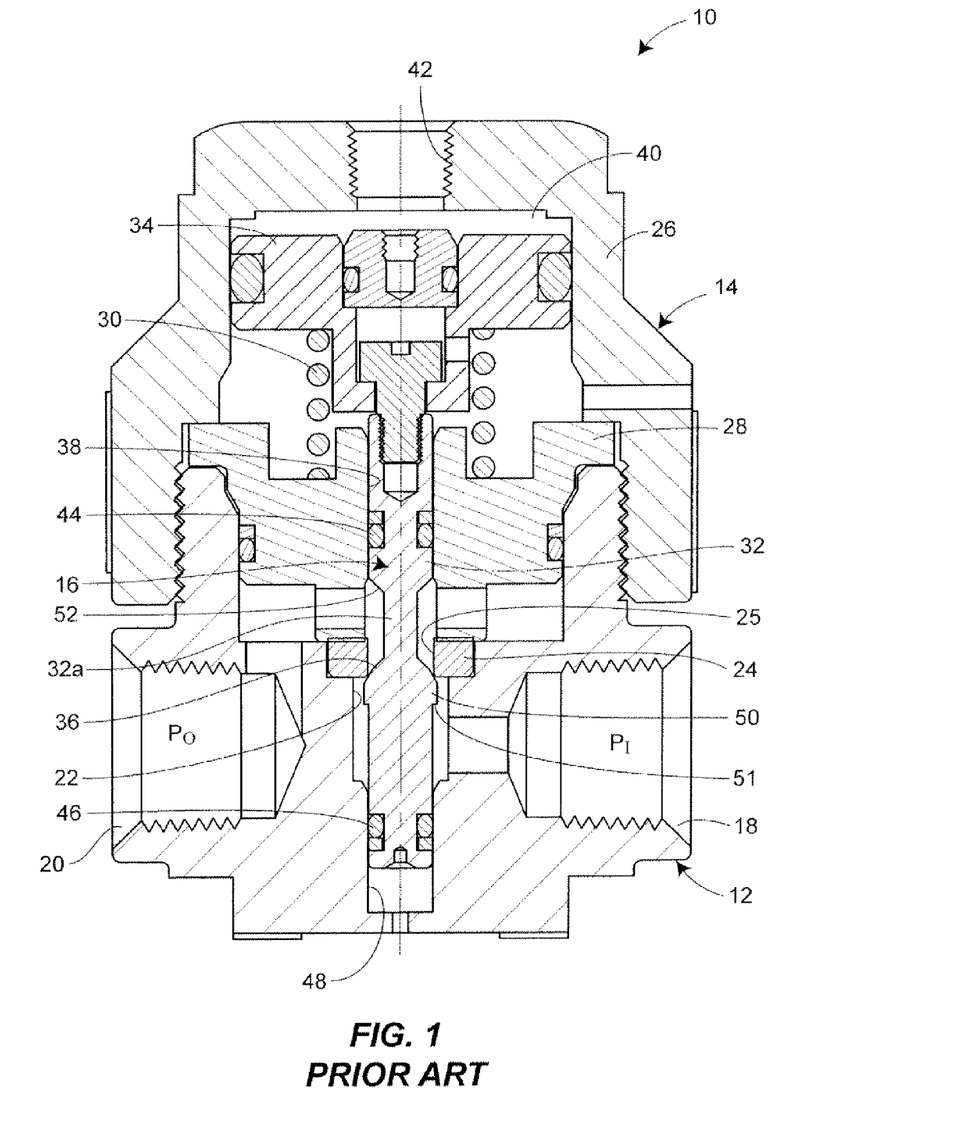
FIG. 1 is a cross-sectional side view of a conventional air-operated bi-directional control valve.

FIG. 1 depicts one example of a conventional bi-directional control valve 10. More particularly, the bi-directional control valve 10 of FIG. 1 includes an air-operated bi-directional control valve 10 in that a pneumatic supply is used to control the control valve 10.

The conventional bi-directional control valve 10 generally includes a valve body 12 and an actuator assembly 14. The actuator assembly 14 contains a control element 16 that is adapted for sliding displacement within the valve body 10 between a closed position, which is illustrated in FIG. 1, and an open position (not shown).

More specifically, the valve body 12 includes an inlet 18, an outlet 20, and a throat 27. The throat 22 carries a valve seat 24 for being engaged by the control element 16 to close the valve 10, as depicted. The actuator assembly 14, as mentioned, includes the control element 16. Additionally, the actuator assembly 14 includes a housing 26, a valve insert 28, and a spring 30. The control element 16 generally includes a stem portion 32 and a piston 34. The stem portion 32 extends through the throat 22 of the valve body 12 and includes a reduced diameter portion 32a defining a generally frustoconical seating surface 36. The seating surface 36 engages the valve seat 24 when the control element 16 is in the closed position.

The valve insert 28 is constructed of 316 stainless steel and defines a bore 38 slidably receiving a portion of the stem portion 32 of the control element 16. The bore 38 in the conventional valve insert 28 includes a diameter that is slightly larger than an outer diameter of the stem portion 32 such that the stem portion 32 may freely reciprocate in the bore 38. Additionally, however, the diameter of the bore 38 is substantially equal to a guide bore 48 in the valve body 12 and slightly smaller than the diameter of a bore 25 in the valve seat 24. For example, in the depicted valve 10, the bore 38 in the valve insert 28 and the guide bore 48 in the valve body 12 include diameters of approximately twenty-five hundredths of an inch (0.25"), while the bore 25 in the valve seat 24 includes a diameter of approximately two-hundred and fifty-seven thousandths of an inch (0.257").

The spring 30 is disposed between the valve insert 28 and the piston 34 such as to bias the piston 34, and therefore the control element 16, upward relative to the orientation of the valve 10 of FIG. 1, and into the closed position. In the conventional valve 10 depicted, the spring may have a load height of approximately sixty-six hundredths of an inch (0.66") and can generate approximately seventy pounds-force (70 lbf) in the closing direction. The housing 26 is threadably attached to the valve body 12 and maintains the positional relationship of the other components.

As depicted in FIG. 1, the piston 34 of the control element 16 is slidably disposed within a piston cavity 40 defined by the housing 26. The housing 26 additionally defines a threaded aperture 42 for threadably receiving a supply line (not shown) connected to a pneumatic supply, for example, a source of compressed shop-air supplied at a pressure of between approximately eighty (80) psig and approximately one-hundred and fifty (150) psig. The force required to move the piston 34 is a function of the surface area of the piston 34. In the disclosed conventional valve 10, the piston 34 includes a diameter of approximately one and three-hundred and seventy-five thousands of an inch (1.375"). This provides a surface area sufficient for the compressed shop-air to displace the piston 34 as required.

So configured, the position of the control element 16 within the control valve 10 can be controlled by introducing compressed air into the piston cavity 40. For example, in the absence of compressed air supplied to the cavity 40, the spring 30 biases the piston 34 into the position depicted in FIG. 1, which causes the seating surface 36 of the stem portion 32 to sealingly engage the valve seat 24 and close the valve 10. However, the introduction of compressed air into the cavity 40 increases the pressure in the cavity 40 above the piston 34, which then causes the piston 34 and the entire control element 16 to displace downward relative to the orientation of the valve depicted in FIG. 1. Accordingly, the seating surface 36 of the stem portion 32 disengages from the valve seat 24 and opens the valve 10 to allow fluid to flow therethrough.

In some conventional applications, when the valve 10 is closed, as depicted in FIG. 1, the fluid process is such that pressure remains built up within the system. Accordingly, the valve 10 experiences an inlet pressure $P_I$ at the inlet 18 of the control valve body 12 and an outlet pressure $P_O$ at the outlet 20 of the valve body 12. The inlet pressure $P_I$ may be equal to, less than, or greater than the outlet pressure $P_O$ at any given instance, or for any given application. The conventional valve 10 depicted is adapted for low pressure applications, where the inlet and outlet pressures $P_I$, $P_O$ may rise to approximately 10,000 psig. In high pressure applications, however, the inlet and outlet pressures may rise to between approximately 10,000 psig and approximately 20,000 psig. Therefore, as shown in FIG. 1, the conventional control valve 10 further comprises an upper o-ring 44 and a lower o-ring 46 disposed around the stem portion 32 of the control element 16.

The upper o-ring 44 closes any gap between the stem portion 32 and the bore 38 in the valve insert 28, thereby providing a fluid-tight seal. Thus, the upper o-ring 44 has an outside diameter that is approximately equal to the diameter of the bore 38, i.e., twenty-five hundredths of an inch (0.25"). The lower o-ring 46 closes any gap between the stem portion 32 and the guide bore 48 formed in the valve body 12. Therefore, the bottom o-ring 46 has an outer diameter substantially equal to the diameter of the guide bore 48 in the valve body 12, i.e., twenty-five hundredths of an inch (0.25"). The upper o-ring 44 prevents the fluid at the outlet 20 of the valve body 12, which is compressed at the outlet pressure $P_O$, from leaking between the stem portion 32 and the valve insert 28. The lower o-ring 46 prevents the fluid at the inlet 18 of the valve body 12, which is compressed at the inlet pressure $P_I$, from leaking between the stem portion 32 and the valve body 12 and into the guide bore 48.

As mentioned above, in the absence of compressed air being supplied to the piston cavity 40 of the housing 26, the spring 30 biases the control element 16 into the closed position, as depicted in FIG. 1, such that the seating surface 36 seats against the valve seat 24. The spring 30 therefore helps establish the character and integrity of this seal.

Additionally, the inlet pressure $P_I$ may help the character and integrity of this seal. For example as shown in FIG. 1, the inlet pressure $P_I$ acts on the portion of the stem portion 32 that is disposed below the valve seat 24. Specifically, the stem portion 32 further includes a shoulder 50 disposed just below the seating surface 36. The shoulder 50 defines a ring-shaped surface 51 that is disposed substantially perpendicular to a longitudinal axis of the stem portion 32. The inlet pressure $P_I$ acts on this shoulder 50 and applies an upward force to the valve stem portion 32 relative to the orientation of the valve 10 in FIG. 1. This force therefore helps seat the seating surface 36 of the stem portion 32 against the valve seat 24. The inlet pressure $P_I$ also acts on the lower o-ring 46 to apply a force to the stem portion 32 in an opposite direction, i.e., the downward direction relative to the orientation of the valve 10 in FIG. 1. However, because an area of the shoulder 50 that is acted on by the inlet pressure $P_I$ is larger than an area of the lower o-ring 46 that is acted on by the inlet pressure $P_I$, a sum of the forces generated by the inlet pressure $P_I$ on the stem portion 32 below the valve seat 24 results in a net force applied upward on the stem 32.

By contrast, the outlet pressure $P_O$ at the outlet 20 of the valve body 12 acts on the portion of the stem portion 32 above the valve seat 24. More specifically, as mentioned above, the stem portion 32 includes the reduced diameter portion 32a. Additionally, the stem portion 32 defines a second frustoconical surface 52 disposed opposite the reduced diameter portion 32a from the seating surface 36. Therefore, the outlet pressure $P_O$ acts on a portion of the seating surface 36 that is located within the bore 25 of the valve seat 24 to apply a force to the stem portion 32 in a downward direction relative to the orientation of the valve 10. The outlet pressure $P_O$ also acts on the second frustoconical surface 52 to apply a force to the stem in the upward direction relative to the orientation of the valve 10. Moreover, the outlet pressure $P_O$ acts on a portion of the upper o-ring 44 carried by the stem portion 32 between the stem portion 32 and the bore 38 in the valve insert 28. The pressure acting on the upper o-ring 44 also generates a force on the stem portion 32 in the upward direction.

However, because the diameter of the bore 38 in the valve insert 28 is smaller than the diameter of the bore 25 in the valve seat 24, the combined area of the second frustoconical surface 52 and the upper o-ring 44 that is acted on by the outlet pressure $P_O$, is less than the area of the portion of the seating surface 36 disposed within the valve seat 24 that is acted on by the outlet pressure $P_O$. Thus, the outlet pressure $P_O$ applies a greater force to the stem portion 32 in the downward direction relative to the orientation of the valve 10 in FIG. 1. Therefore, when the outlet pressure $P_O$ and the inlet pressure $P_I$ are substantially equal, the downward force generated by the outlet pressure $P_O$ at least partially negates the upward force generated by the inlet pressure $P_I$. Accordingly, the spring 30 is the sole component serving to ensure that the seating surface 36 of the stem portion 32 remains seated against the valve seat 24.

Typically, the spring 30 is sufficient to provide this function. However, under high pressure conditions, i.e., between approximately 10,000 psig and approximately 20,000 psig, the difference in the forces generated by the inlet and outlet pressures $P_I$, $P_O$ and applied to the stem 32, and the effects created thereby, can become substantial. This can compromise the integrity of the seat between the seating surface 36 of the stem portion 32 and the valve seat 24, and therefore, the performance of the valve 10.

SUMMARY

One aspect of the present invention provides a high pressure fluid control device. The fluid control device comprises a valve body defining an inlet, an outlet, and a throat disposed between the inlet and the outlet. A valve seat is mounted in the throat of the valve body. A control element is disposed within the valve body and movable between an open position and a closed position. The control element comprises a stem defining a reduced diameter portion and a seating surface disposed adjacent to the reduced diameter portion. At least a portion of the reduced diameter portion is disposed within the valve seat when the control element is in the closed position such that the seating surface seats against the valve seat and the seating surface and the reduced diameter portion are in fluid communication with the outlet. A valve insert carried by the valve body. The valve insert defines a bore slidably receiving a portion of the stem of the control element. The bore in the valve insert has a diameter that is substantially equal to a diameter of the valve seat.

In one embodiment, a spring is carried by the valve insert and engages the control element to bias the control element into the closed position.

In another embodiments, the stem comprises a second surface disposed opposite the reduced diameter portion from the first surface.

In one embodiments, the first surface faces the second surface.

In still another embodiment, at least one of the first surface and the second surface comprises a frustoconically shaped surface.

The control element of yet another embodiment further comprises a first o-ring carried by the stem, the first o-ring providing a seal between the stem and the bore of the valve insert.

In yet another embodiment, the seating surface of the stem defines a first area when the control element is in the closed position such that the stem and at least a portion of the first o-ring combine to define a second area. The first area may be substantially equal to the second area.

In one embodiment, the control element further comprises a second o-ring carried by the stem at a location opposite the valve seat from the first o-ring. The second o-ring is disposed in fluid communication with the inlet and provides a seal between the stem and the valve body.

In one embodiment, the second o-ring has an outer diameter smaller than an outer diameter of the first o-ring.

Accordingly, at least in one embodiment, the high-pressure fluid control device includes a bi-directional valve. The control element of the bi-directional valve is in fluid communication with an outlet pressure and an inlet pressure when the valve is closed such that a sum of the forces applied to the control element result in a net force applied to urge the control element into a closed position against a valve seat. The control element is balanced on an outlet side of the valve seat such that the outlet pressure applies approximately no net force to the control element on the outlet side the valve seat. In contrast, the control element is unbalanced on an inlet side of the valve seat such that inlet pressure applies a net force on the control element on the inlet side of the valve seat to bias the control element into the closed position against the valve seat.

DETAILED DESCRIPTION

Figure 2:
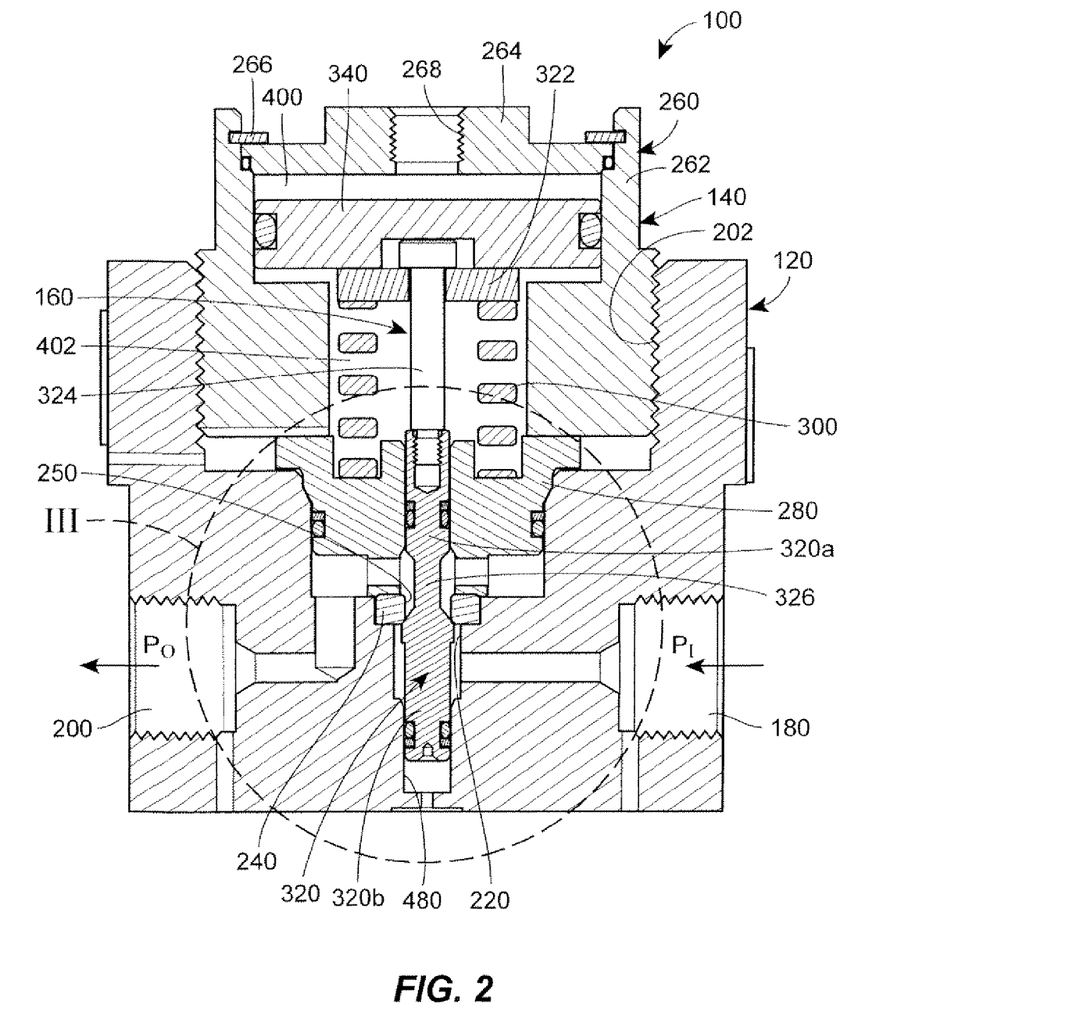
FIG. 2 is a cross-sectional side view of one embodiment of an air-operated bi-directional control valve constructed in accordance with the present invention.

FIG. 2 depicts one embodiment of an air-operated bi-directional control valve 100 constructed in accordance with the principles of the present invention and adapted for applications sustaining high pressures, i.e., pressures up to approximately 20,000 psig. The control valve 100 is designed and configured to alleviate the deficiencies in the prior art, especially under high pressure conditions. The benefits and advantages of the control valve 100 will be understood from the following detailed description, which presents one example of a control valve constructed in accordance with the present invention and is not intended to limit the scope of the claims provided herein.

The control valve 100 generally includes a high-pressure valve body 120 and an actuator assembly 140. The actuator assembly 140 contains a control element 160 that is adapted for sliding displacement within the valve body 100 between a closed position, which is illustrated in FIG. 2, and an open position (not shown).

More specifically, the valve body 120 includes an inlet 180, an outlet 200, a throat 220, a mouth 202, and a guide bore 480. The throat 220 carries a valve seat 240 for being engaged by the control element 160 to close the valve 100, as depicted. The valve seat 240 is a generally ring-shaped body defining a bore 250. In the disclosed embodiment, the bore 250 in the valve seat 240 has a diameter $D_1$ (shown in FIG. 3) of approximately two-hundred and fifty-seven thousandths of an inch (10.257").

Referring back to FIG. 2, the actuator assembly 140 is mounted to the mouth 202 of the valve body 120 and, as mentioned, includes the control element 160. The control element 160 generally includes a stem 320, a spring seat 322, and a piston 340 secured together by a fastener 324. Additionally, the actuator assembly 140 includes a housing 260, a valve insert 280, and a spring 300. The housing 260 includes a body 262 and an end plate 264 secured together with a snap-ring 266. The body 262 and the end plate 264 define a piston cavity 400 and a spring cavity 402. The piston cavity 400 slidably retains the piston 340 of the control element 160. The spring cavity 402 accommodates the spring 300, the spring seat 322, and the fastener 324. The end plate 264 includes a threaded aperture 268 for being coupled to a pneumatic supply line (not shown), for example. The pneumatic supply line may be adapted to supply compressed air to the piston cavity 400. The body 262 of the housing 260 is threadably attached to the mouth 202 of the valve body 120. Therefore, the body 262, in combination with the valve body 120, maintains the positional relationship of the other components of the actuator assembly 140. Specifically, the body 262 engages the valve insert 280 such that the valve insert 280 remains positioned within the mouth 202 of the valve body 120. The valve insert 280 thereby serves to maintain the alignment of the control element 160 by slidably retaining the stem 320.

The stem 320 of the control element 160 extends from the actuator assembly 140 and through the throat 220 of the valve body 120. The stem 320 generally includes an upper portion 320a, a lower portion 320b, and a neck 326 disposed between the upper and lower portions 320a, 320b.

Figure 3:
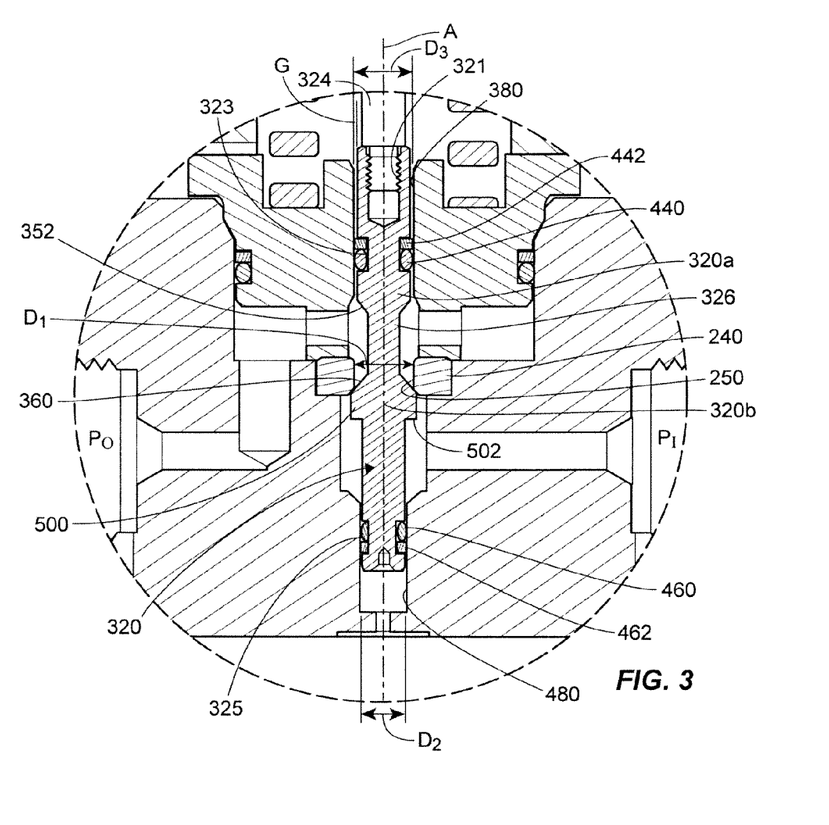
FIG. 3 is a partial cross-sectional side view of the control valve of FIG. 2 taken from circle III in FIG. 2.

As illustrated in FIG. 3, the upper portion 320a of the stem 320 includes a threaded bore 321 and an annular recess 323. The threaded bore 321 is in threaded engagement with the fastener 324. The annular recess 323 accommodates an upper o-ring 440 and a back-up ring 442. The back-up ring, 442 includes a plastic ring sized and configured to maintain the position of the upper o-ring 440 in the recess 323. In the disclosed embodiment, the upper o-ring includes a cross-sectional diameter of approximately seven thousandths of an inch (0.07"). However, alternative embodiments may include generally any size o-ring suitable for a specific application.

The lower portion 320b of the stem 320 is partially slidably disposed in the guide bore 480 of the valve body 120. Accordingly, the guide bore 480 has a diameter $D_3$ that is larger than a diameter of the lower portion 320b of the stem 320. In the disclosed embodiment, the guide bore 480 has a diameter $D_2$ of approximately twenty-five hundreds of an inch (0.25"). The lower portion 320b of the stem 320 defines an annular recess 325. The annular recess 325 in the lower portion 320b accommodates a lower o-ring 460 and a back-up ring 462. The back-up ring 462 is sized and configured to maintain the position of the lower o-ring 460 in the recess 325. The lower portion 320b of the stem 320 further includes a shoulder 500 disposed between the annular recess 325 in the lower position 320b of the stem 320 and the neck 326 of the stem 320. As depicted in FIG. 3 the shoulder 500 includes a ring-shaped surface 502 that is disposed in a plane that intersects with a longitudinal axis of the stem 320. The longitudinal axis is identified by reference character A in FIG. 3. The ring-shaped surface 502 of the disclosed embodiment is substantially perpendicular to the longitudinal axis A of the stem 320. In an alternative embodiment, however, the surface 502 may be disposed in a plane disposed at generally any angle that is transverse to, i.e., intersecting, the longitudinal axis A.

The neck 326 of the stem 320 is bounded on its opposing axial ends by a seating surface 360 and a second surface 352. The seating surface 360 seats against the valve seat 240 when the control element 160 is in the closed position, as depicted. In the disclosed embodiment, the seating surface 360 includes a generally frustoconical surface converging from the lower portion 320b of the stem 320 to the neck 326. By contrast, the second surface 352 includes a frustoconical surface converging from the upper portion 320a of the stem 320 to the neck 326. While the seating and second surfaces 360, 352 are disclosed herein as including frustoconical surfaces, alternative embodiments may include generally any shaped surface, includes surfaces having at least a portion is disposed in a plane that is transverse to, i.e., intersecting, the longitudinal axis A of the stem 320. So configured, the neck 326 includes a diameter that is smaller than the diameter of the remaining portion of the stem 320 and/or the diameter $D_1$ of the bore 250 in the valve seat 240. Thus, with the valve 10 in an open position (not shown), the neck 326 is disposed within the bore 250 of the valve seat 240 such that fluid in the system may travel between the inlet 180 and the outlet 200 of the valve body 120.

Still referring to FIG. 3, the valve insert 280 defines a bore 380 that slidably receives the tipper portion 320a of the stem 320 of the control element 160. The bore 380 includes a diameter that is slightly larger than an outer diameter of at least the upper portion 320a of the stem 320 such that the stem 320 may freely reciprocate in the bore 380 during operation of the valve 100. Accordingly, a gap, which is identified by reference character G in FIG. 3, is disposed between the stem 320 and the bore 380. In the disclosed embodiment of the valve 100, the bore 380 includes a diameter $D_3$ of approximately two-hundred and fifty-six thousandths of an inch (0.256"). Accordingly, the diameter $D_3$ of the bore 380 in the valve insert 20 of the present embodiment of the valve 100 is approximately equal to the diameter $D_1$ of the bore 250 in the valve seat 240, which, as stated above, is approximately two-hundred and fifty-seven thousandths of an inch (0.257"). Additionally, the diameters $D_1$, $D_3$ of the bores 250, 280 in the valve seat 240 and valve insert 280 are each larger than the diameter $D_2$ of the guide bore 480 in the valve body 120, which, in the disclosed embodiment, is approximately twenty-five hundredths of an inch (0.25"), as stated above.

Referring back to FIG. 2, the spring 300 of the present embodiment of the valve 100 is disposed between the valve insert 280 and the spring seat 322 of the control element 160. Thus, the spring 300 biases the control element 160, upward relative to the orientation of the valve 100 of FIG. 2, and into the depicted position. Therefore, as mentioned, the piston 340 of the control element 160 is slidably disposed within the piston cavity 400 defined by the body 262 and the end plate 264 of the housing 260.

So configured, the position of the control element 160 within the control valve 10 is controlled by introducing compressed air into the piston cavity 400 via the threaded aperture 268. In the absence of compressed air supplied to the cavity 400, the spring 300 biases the piston 340 into the position depicted in FIG. 2, which causes the seating surface 360 of the stem 320 to seat against the valve seat 240 and close the valve 100. Upon the introduction of air into the cavity 400, however the pressure in the cavity 400 increases and overcomes the force generated by the sprint, 300, which causes the piston 340 and the entire control element 160 to displace downward relative to the orientation of the valve 100 depicted in FIG. 2. Accordingly, the seating surface 360 of the stem 320 disengages from the valve seat 240 and opens the valve 100 to allow fluid to flow therethrough.

When the valve 100 is closed, as depicted in FIGS. 2 and 3, the fluid process is such that pressure remains built up within the system. Accordingly, the valve 100 experiences an inlet pressure $P_I$ at the inlet 180 of the valve body 120 and an outlet pressure $P_O$ at the outlet 200 of the valve body 120. The inlet pressure $P_I$ may be equal to, less than, or greater than the outlet pressure $P_O$ at any given instance, or for any given application. For low pressure applications, the inlet and outlet pressures $P_I$, $P_O$ may rise to approximately 10,000 psig. In high pressure applications, the inlet and outlet pressures may rise to between approximately 10,000 psig and approximately 20,000 psig. In such pressurized applications, the upper and lower o-rings 440, 460 operate to contain the fluid in the inlet and outlet 180, 200 regions of the valve 100, and to prevent leakage that may affect the performance of the valve 100.

Specifically, the upper o-ring 440 closes the gap G between the stem 320 and the bore 380 in the valve insert 280, thereby providing a fluid-tight seal. The lower o-ring 460 closes and seals a similar gap between the stem 320 and the guide bore 480 formed in the valve body 120. Therefore, the upper o-ring 440 prevents the fluid at the outlet 200 of the valve body 120, which is compressed at the outlet pressure $P_O$, from leaking between the stem 320 and the valve insert 280. The lower o-ring 460 prevents the fluid at the inlet 180 of the valve body 120, which is compressed at the inlet pressure $P_I$, from leaking between the stem 320 and the valve body 120 and into the guide bore 480 in the valve body 120.

As mentioned above, in the absence of compressed air being supplied to the piston cavity 400 of the housing 260, the spring 300 biases the control element 160 into the closed position, as depicted in FIG. 2, such that the seating surface 360 seats against the valve seat 240. The spring 300 therefore helps establish the character and integrity of this seat.

Additionally, the inlet pressure $P_I$ helps the character and integrity of this seat. For example, as shown in FIG. 3, inlet pressure $P_I$ acts on the portion of the stem 320 that is disposed below the valve scat 240. Specifically, the inlet pressure $P_I$ acts on the surface 502 of the stem 320 disposed adjacent to the shoulder 500 and applies an upward force to the valve stem 320 relative to the orientation of the valve 100 in FIGS. 2 and 3. This upward force therefore helps seat the seating surface 360 of the stem 320 against the valve seat 240. The inlet pressure $P_I$ also acts on the lower o-ring 460 to apply a force to the stem 320 in an opposite direction, i.e., the downward direction relative to the orientation of the valve 100 in FIGS. 2 and 3. However, because the area of the surface 502 that is acted on by the inlet pressure $P_I$ is larger than the area of the lower o-ring 460 acted on by the inlet pressure $P_I$, the sum of the forces in the upward and downward direction applied by the inlet pressure $P_I$ results in a net force oil the stem 320 in the upward direction.

The outlet pressure $P_O$ at the outlet 200 of the valve body 120 acts on the portion of the stem 320 above the valve seat 240. More specifically, the outlet pressure $P_O$ acts on a portion of the seating surface 360 that is located within the bore 250 of the valve seat 240 to apply a force to the stem 320 in a downward direction relative to the orientation of the valve 100. By contrast, the outlet pressure $P_O$ also acts on the second surface 352 to apply a force to the stem 320 in the upward direction relative to the orientation of the valve 100. Moreover, the outlet pressure $P_O$ acts on a portion of the tipper o-ring 440 carried by the stem 320 and exposed within the gap G between the stem 320 and the bore 380 in the valve insert 280. The pressure acting on the upper o-ring 440 also generates a force on the stem 320 in the upward direction.

As mentioned above, the diameter $D_3$ of the bore 380 in the valve insert 280 is substantially equal to the diameter $D_1$ of the bore 250 in the valve seat 240. Therefore, the combined area of the second surface 352 and the portion of the upper o-ring 440 exposed within the gap G that is acted on by the outlet pressure $P_O$ is substantially equal to the area of the seating surface 360 exposed within the bore 250 in the valve seat 240 and acted on by the outlet pressure $P_O$. Thus, the outlet pressure $P_O$ applies substantially equal forces to the stem 320 in substantially equal and opposite directions above the valve seat 240, thereby resulting in approximately no net force applied to the stem 320 by the outlet pressure $P_O$ in either the upward or downward direction. The net upward force generated by the inlet pressure $P_I$ and applied to the surface 502 of the shoulder 500 of the stem 320 therefore assists the spring 300 of the present embodiment of the valve 100 to maintain the seating surface 360 seated against the valve seat 240. Thus, this positive upward force on the stem 320 provides a substantial benefit under high pressure conditions, i.e., between approximately 10,000 psig and approximately 20,000 psig.

Other aspects of the valve 100 of the present invention also provide substantial benefits under high pressure conditions. For example, the spring 300 may be larger than the spring 30 of the conventional air-operated bi-directional valve 10. Specifically, the spring 300 may include a compression coil spring that venerates approximately one-hundred and thirty five pounds-force (135 lbf), as opposed to the conventional seventy pounds-force (70 lbf). Accordingly, the larger spring 300 can withstand much higher forces to thereby maintain the stem 320 seated against the valve seat 240.

Furthermore, the diameter of the piston 340 of the control element 160 of the present embodiment of the present invention is larger than the diameter of the piston 34 of the conventional control element 16. Specifically, the piston 340 of the control element 160 of the present embodiment of the present invention is approximately one and eight-hundred and seventy-five thousandths of an inch (1.875"), as opposed to one and three-hundred and seventy-live hundredths of an inch (1.375"), which is the size of the conventional piston 34. So configured, the valve 100 of the present invention may be operated with standard compressed shop-air delivered to the piston cavity 400 at a pressure of between approximately eighty (80) psig and one-hundred and fifty (150) psig, because the larger diameter of the piston 340 provides a larger surface area for the pressure to act against, thereby enabling the same air pressure to generate sufficient force to overcome the larger spring 300.

Finally, the valve insert 280 of the present embodiment of the valve 100 may be constructed of a stronger material than the valve insert 28 of the conventional valve 10. Specifically, in one embodiment, the valve insert 280 may be constructed on 17-4 stainless steel, as opposed to the 316 stainless steel of the conventional valve insert 28. The stronger steel valve insert 280 resists deformation and/or deterioration under high pressure conditions and therefore increases the useful life of the control valve.

While the present disclosure has thus far included a description of a valve 100 including a high-pressure valve body 120, and therefore, adapted for use in high pressure applications, the present invention may also be beneficially incorporated into a valve adapted for low pressure applications.

Figure 4:
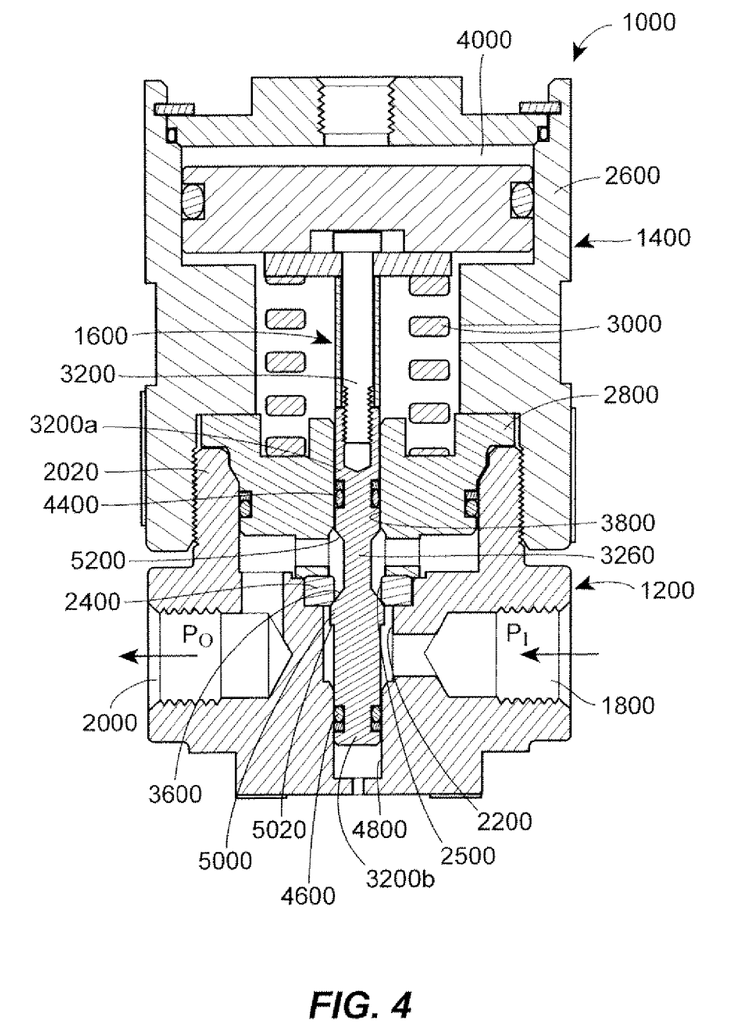
FIG. 4 is a partial cross-sectional side view of another embodiment of an air-operated bi-directional control valve constructed in accordance with the principles of the present invention.

For example, FIG. 4 depicts another embodiment of a control valve 1000 constructed in accordance with the principles of the present invention. The control valve 1000 depicted in FIG. 4 is substantially similar to the control valve 100 depicted in FIGS. 2 and 3 with the exception that it is adapted for low pressure applications, i.e., pressures up to approximately 10,000 psig. Specifically, the control valve 1000 includes a low-pressure valve body 1200 and an actuator assembly 1400. The low-pressure valve body 1200 is substantially similar to the high-pressure valve body 120 except that it is generally smaller. Specifically, the low-pressure valve body 1200 includes an inlet 1800, an outlet 2000, a throat 2200, a mouth 2020, and a guide bore 4800, and it accommodates a valve seat 2400. Accordingly, the low-pressure valve body 1200 accommodates the actuator assembly 1400 in generally the same manner as that described above with reference to the control valve 100 disclosed in FIGS. 2 and 3.

The actuator assembly 1400 is generally identical to the actuator assembly 140 discussed above with reference to FIGS. 2 and 3. Specifically, the actuator assembly 1400 includes a control element 1600, a valve insert 2800, and a housing 2600. The housing 2600 includes a body 2620 and an end plate 2640 defining a piston cavity 4000 and a spring cavity 4020 accommodating the control element 1600 and a spring 3000. The control element 1600 and the spring 3000 are substantially identical to the control element 160 and the spring 300 discussed above with reference to the valve 100 in FIGS. 2 and 3, and therefore, the details of each will not be repeated.

Additionally, the valve insert 2800 includes a bore 3800 slidably receiving an upper portion 3200a of a stem 3200 of the control element 1600, which carries an upper o-ring 4400 in a manner identical to the stem 320 described above with reference to FIGS. 2 and 3. Additionally, the guide bore 4800 in the valve body 1200 slidably receives a lower portion 3200b of the stem 3200, which carries a lower o-ring 4600 in a manners identical to the stem 320 described above with reference to FIGS. 2 and 3. The stem 3200 further defines a reduced diameter portion 3260 and a shoulder 5000. The shoulder 5000 includes a ring-shaped surface 5020 disposed substantially perpendicular to a longitudinal axis of the stem 3200. The reduced diameter portion 3260 is disposed between, or bounded by, a seating surface 3600 and a second surface 5200, which is identical to the reduced diameter portion 326 of the stem 320 discussed above with reference to FIGS. 2 and 3. Accordingly, the seating surface 3600 seats against a bore 2500 in the valve scat 2400 to close the valve 1000.

Furthermore, identical to that described above with reference to the valve 100 in FIGS. 2 and 3, the bore 2500 in the valve seat 2400 in FIG. 4 includes a diameter that is substantially equal to a diameter of the bore 4800 in the valve insert 2800. Specifically, in the disclosed embodiment, the diameter of the bore 2500 in the valve seat 2400 is approximately two-hundred and fifty-seven thousandths of an inch (0.257"), and the diameter of the bore 4800 in the valve insert 2800 is approximately two-hundred and fifty-six thousandths of an inch (0.256"). Furthermore, similar to that described above with reference to the valve 100 in FIGS. 2 and 3, the guide bore 4800 in the valve body 1200 includes a diameter of approximately twenty-five hundredths of an inch (0.25"). So dimensioned, the diameters of the bores 2500, 4800 in the valve seat 2400 and the valve insert 2800, respectively, are larger than the diameter of the guide bore 4800 in the valve body 1200.

Accordingly, with the valve 1000 closed, as depicted in FIG. 4, inlet pressure $P_I$ and outlet pressure $P_O$ may build up within the inlet 1800 and outlet 2000 of the valve 1200, respectively. The inlet pressure $P_I$ may be equal to, less than, or greater than the outlet pressure $P_O$ at any given instance, or for any given application. For low pressure applications, the inlet and outlet pressures $P_I$, $P_O$ may rise to approximately 10,000 psig. So pressurized, the tipper and lower o-rings 4400, 4600 operate to contain the fluid in the inlet and outlet 1800, 2000 regions of the valve 1000, and to prevent leakage into the actuator assembly 1400 and guide bore 4800 in a manner identical to the valve 100 described above with reference to FIGS. 2 and 3.

In the absence of compressed air being supplied to the piston cavity 4000 of the actuator assembly 1400, the spring 3000 biases the control element 1600 into the closed position depicted in FIG. 4. The spring 3000 therefore helps establish the character and integrity of the seat between the seating surface 3600 of the stem 3200 and the valve seat 2400.

Additionally, the inlet pressure $P_I$ helps establish the character and integrity of this seat. Specifically, the inlet pressure $P_I$ acts on the surface 5020 of the stem 3200 disposed adjacent to the shoulder 5000 and applies an upward force to the valve stem 3200 relative to the orientation of the valve 1000. This upward force therefore helps seat the seating surface 3600 of the stem 3200 against the valve seat 2400. The inlet pressure $P_I$ also acts on the lower o-ring 4600 to apply a force to the stem 3200 in an opposite direction, i.e., the downward direction relative to the orientation of the valve 1000. However, because the area of the surface 5020 that is acted on by the inlet pressure $P_I$ in the upward direction is larger than the area of the lower oaring 4600 acted on by the inlet pressure $P_I$, the sum of the forces in the upward and downward direction applied by the inlet pressure $P_I$ results in a net force on the stem 3200 in the upward direction.

The outlet pressure $P_O$ at the outlet 2000 of the valve body 1200 acts on the portion of the stem 3200 above the valve seat 2400. More specifically, the outlet pressure $P_O$ acts on a portion of the seating surface 3600 that is located within the bore 2500 of the valve seat 2400 to apply a force to the stem 3200 in a downward direction relative to the orientation of the valve 1000. By contrast, the outlet pressure $P_O$ also acts on the second surface 5200 to apply a force to the stem 3200 in the upward direction relative to the orientation of the valve 1000. Moreover, the outlet pressure $P_O$ acts on a portion of the upper o-ring 4400 carried by the stem 3200 and exposed between the stem 3200 and the bore 3800 in the valve insert 2800. The pressure acting on the upper o-ring, 4400 also generates a force on the stem 3200 in the upward direction.

As mentioned above, the diameter of the bore 3800 in the valve insert 2800 is substantially equal to the diameter of the bore 2500 in the valve seat 2400. Therefore, the combined area of the second surface 5200 and the portion of the upper o-ring 4400 that is acted on by the outlet pressure $P_O$ is substantially equal to the area of the seating surface 3600 exposed within the bore 2500 in the valve seat 2400 and acted on by the outlet pressure $P_O$. Thus, the outlet pressure $P_O$ applies substantially equal forces to the stem 3200 in substantially equal and opposite directions above the valve seat 2400, thereby resulting in approximately no net force applied to the stem 3200 by the outlet pressure $P_O$ in either the upward or downward direction. The net upward force generated by the inlet pressure $P_I$ and applied to the surface 5020 of the shoulder 5000 of the stem 3200 therefore assists the spring 3000 of the present embodiment of the valve 1000 to maintain the seating surface 3600 seated against the valve seat 2400.

While the valve 1000 depicted in FIG. 4 has thus far been described as being adapted to low pressure applications the spring 3000 and control element 1600 are sufficient to operate in higher pressure applications as well, i.e., applications having pressures greater than 10,000 psig. Specifically, as described with reference to the valve 100, the springs 300, 3000 generate approximately one hundred and thirty-five pounds-force (135 lbf), which is substantially greater than the spring 30 of the conventional valve depicted in FIG. 1. Additionally, the control element 1600 of the valve 1000 in FIG. 4 includes a piston having a greater diameter than the control element 16 of the conventional valve 10. Thus, as described with reference to the valve 100 depicted in FIGS. 2 and 3, typical shop air compressed to a pressure between approximately eighty (80) psig and one hundred and fifty (150) psig may be used to actuate the control valve 1000 out of the closed position. Thus the same control elements 160, 1600 and springs 300, 3000 are advantageously adapted to be utilized in both low pressure and high pressure applications.

While the bores 380, 3800 in the valve inserts 280, 2800 have been disclosed herein as being approximately two-hundred and fifty-six thousandths of an inch (0.256") in diameter and the bores 250, 2500 in the valve seats 240, 2400 have been disclosed herein as being approximately two-hundred and fifty-seven thousandths of an inch (0.257") in diameter, in an alternative embodiment, the diameters may be identical, thereby minimizing any possibility of the outlet pressure $P_O$ applying a resultant force in either the upward or the downward direction of the stem 320, 3200.

Finally, while the control valves 100, 1000 have been described herein as including air-operated bi-directional control valves, the principles of the present invention are not limited to such applications, but rather, may be advantageously incorporated into other types of fluid control devices to achieve similar benefits. For example, the principles of the present invention may be incorporated into lever-operated control valves, diaphragm actuated control valves, screw actuated control valves, or any other type of control valve, fluid regulator, or otherwise.

Further still, while the control valves 100, 1000 have been described herein as including an actuator assembly 140, 1400 adapted to connected to a pneumatic supply line, for example, for controlling the position of the control element, alternative embodiments of the valves may additionally include a low pressure solenoid adapted to control pneumatic supply line and therefore the open or close position of the control element. Another alternative embodiment may include a switch, or a hall effect sensor, for example, for detecting a position of the control element and displaying the position to an operations engineer, for example, for determining the status of the control valve. Other variations, modifications, and alterations within the spirit and scope of the claims are intended to be within the scope of the present invention.

Therefore, the present invention advantageously provides an air-operated bi-directional control valve 100, 1000 sized and configured such that pressure within the system naturally biases the valve into a closed position in the absence of supplied controlling air pressure. Specifically, the present invention provides a control element and valve insert for a bi-directional valve that is substantially balanced above the valve seat, i.e., a sum of the forces applied to the stem by the outlet pressure is zero above the valve seat, and configured such as to produce a net force in the seating direction below the valve seat.

In light of the foregoing, it should be appreciated that the present detailed description provides merely an example of an air-operated bi-directional control valve constructed in accordance with the principles of the present invention. Variations and modifications, including variations in the materials utilized, that do not depart from the spirit and scope of the present invention are intended to be within the scope of the appended claims.

What is claimed is:

1. A high pressure fluid control device, comprising:
a valve body defining an inlet accommodating an inlet pressure, an outlet accommodating an outlet pressure, and a throat disposed between the inlet and the outlet;
a valve seat mounted in the throat of the valve body and defining a bore;
a control element disposed within the valve body and movable between an open position and a closed position, the control element comprising a stem having an upper portion and a lower portion, and defining a reduced diameter portion between the upper and lower portions and a seating surface disposed adjacent to the reduced diameter portion, at least a portion of the reduced diameter portion being disposed within the bore of the valve seat when the control element is in the closed position such that the seating surface seats against the valve seat and the seating surface and the reduced diameter portion are in fluid communication with the outlet;

a valve insert carried by the valve body, the valve insert defining a bore slidably receiving the upper portion of the stem of the control element, the bore in the valve insert having a diameter that is substantially equal to a diameter of the bore in the valve seat such that the outlet pressure applies an outlet force to the stem that is substantially equal to zero when the control element is in the closed position;

a shoulder disposed on the stem at a location opposite the throat from the outlet and in fluid communication with the inlet;

a guide bore defined by the valve body and disposed opposite the throat from the outlet and in fluid communication with the inlet, the guide bore slidably receiving the lower portion of the stem and having a diameter that is less than the diameter of the bore in the valve insert such that the inlet pressure applies an inlet force to the stem that is greater than the outlet force applied by the outlet pressure when the control element is in the closed position, thereby biasing the control element into the closed position; and a spring carried by the valve insert and engaging the control element to bias the control element into the closed position.

2. The device of claim 1, wherein the stem comprises a second surface disposed opposite the reduced diameter portion from the seating surface.

3. The device of claim 2, wherein the seating surface faces the second surface.

4. The device of claim 2, wherein at least one of the seating surface and the second surface comprises a frustoconically shaped surface.

5. The device of claim 1, wherein the control element further comprises a first O-ring carried by the stem, the first O-ring providing a seal between the stem and the bore of the valve insert.

6. The device of claim 5, wherein the seating surface of the stem defines a first area in communication with the outlet when the control element is in the closed position, and the stem and at least a portion of the first O-ring combine to define a second area in communication with the outlet when the control element is in the closed position, the first area being substantially equal to the second area.

7. The device of claim 5, wherein the control element further comprises a second O-ring carried by the stem at a location opposite the valve seat from the first O-ring, the second O-ring in fluid communication with the inlet and providing a seal between the stem and the valve body.

8. The device of claim 7, wherein the second O-ring has an outer diameter smaller than an outer diameter of the first O-ring.

9. A high pressure fluid control device, comprising:
a valve body defining an inlet, an outlet, and a throat disposed between the inlet and the outlet, the inlet adapted to accommodate an inlet pressure and the outlet adapted to accommodate an outlet pressure;

a valve seat mounted in the throat of the valve body; and a control element disposed within the valve body for displacement between an open position and a closed position, the control element defining a first area in fluid communication with the outlet when the control element is in the closed position, and a second area at least partially facing the first area and in fluid communication with the outlet when the control element is in the closed position, the first area substantially equal to the second area such that the outlet pressure applies substantially equal and substantially opposite first and second forces on the first and second areas, respectively, when the control element is in the closed position, wherein a sum of the first and second forces is approximately zero; and a third area and a fourth area defined by the control element and in fluid communication with the inlet such that the inlet pressure applies third and fourth forces to the third and fourth surfaces, respectively, when the control element is in the closed position, wherein a sum of the third and fourth forces is greater than the sum of the first and second forces such that the sum of the third and fourth forces biases the control element into the closed position.

10. The device of claim 9, wherein the control element comprises a reduced diameter portion and first and second surfaces disposed on opposing axial ends of the reduced diameter portion.

11. The device of claim 10, wherein the first surface of the control element generally faces the second surface of the control element.

12. The device of claim 10, wherein at least one of the first surface and the second surface comprises a frustoconically shaped surface.

13. The device of claim 9, further comprising a valve insert carried by the valve body, the valve insert defining a bore slidably receiving the control element.

14. The device of claim 13, wherein the control element further comprises an O-ring sealingly engaging the bore in the valve insert.

15. The device of claim 14, wherein the first surface and at least a portion of the O-ring define the first area of the control element and the second surface defines the second area of the control element.

16. The device of claim 13, wherein the bore in the valve insert has a diameter that is substantially equal to a diameter of a bore in the valve seat.

17. The device of claim 9, further comprising a spring carried by the valve body, the spring engaging the control element to bias the control element into the closed position.

18. A high pressure fluid control device, comprising:
a valve body defining an inlet and an outlet, the inlet adapted to accommodate an inlet pressure, the outlet adapted to accommodate an outlet pressure;

a valve seat mounted in the valve body;

a control element slidably disposed in the valve body between an open position and a closed position, the control element comprising a stem defining a reduced diameter portion disposed between first and second surfaces, the reduced diameter portion, and the first and second surfaces in fluid communication with the outlet when the control element is in the closed position;

a valve insert carried by the valve body, the valve insert defining a bore slidably accommodating at least a portion of the stem of the control element, the valve seat and the bore in the valve insert sized and configured such that the outlet pressure applies substantially equal and substantially opposite first and second forces to the first and second surfaces of the control element, respectively, when the control element is in the closed position such that a sum of the first and second forces is approximately zero; and third and fourth surfaces defined by the control element and in fluid communication with the inlet of the valve body such that the inlet pressure applies third and fourth forces to the third and fourth surfaces, respectively, when the control element is in the closed position, wherein a sum of the third and fourth forces is greater than the sum of the first and second forces such that the sum of the third and fourth forces biases the control element into the closed position.

19. The device of claim 18, wherein the bore in the valve insert has a diameter that is substantially equal to a diameter of a bore in the valve seat.

20. The device of claim 18, wherein the first and second surfaces are disposed transverse to a longitudinal axis of the control element.

21. The device of claim 20, wherein the first and second surfaces at least partially define corresponding first and second areas of the control element in fluid communication with the outlet of the valve body when the control element is in the closed position, the first area being substantially equal to the second area.

22. The device of claim 21, further comprising an O-ring carried by the stem and sealingly engaging the bore in the valve insert.

23. The device of claim 22, wherein the first surface of the control element and at least a portion of the O-ring define the first area, and the second surface defines the second area.

24. The device of claim 20, wherein the first surface of the control element generally faces the second surface of the control element.

25. The device of claim 24, wherein at least one of the first surface and the second surface comprises a frustoconically shaped surface.

26. A high pressure fluid control device, comprising:
a valve body defining an inlet, an outlet, and a throat disposed between the inlet and the outlet, the inlet adapted to accommodate an inlet pressure, the outlet adapted to accommodate an outlet pressure;
a control element comprising an upper portion, a lower portion, and a reduced diameter portion disposed between the upper and lower portions and between opposing first and second surfaces of the control element, the control element slidably disposed within the valve body between an open position and a closed position, the first and second surfaces being disposed in fluid communication with the outlet when the control element is in the closed position;
a valve seat mounted in the throat of the valve body and comprising a bore, the bore in the valve seat engaged by the second surface of the control element and disposed in fluid communication with the outlet when the control element is in the closed position; and
a valve insert carried by the valve body, the valve insert defining a bore slidably receiving the control element, the bore in the valve insert disposed in fluid communication with the outlet when the control element is in the closed position, the bore in the valve insert having a diameter that is substantially equal to a diameter of the bore in the valve seat such that the outlet pressure applies an outlet force to the stem that is substantially equal to zero when the control element is in the closed position;
a shoulder disposed on the stem at a location opposite the throat from the outlet and in fluid communication with the inlet; and
a guide bore defined by the valve body and disposed opposite the throat from the outlet and in fluid communication with the inlet, the guide bore slidably receiving the lower portion of the stem and having a diameter that is less than the diameter of the bore in the valve insert such that the inlet pressure applies an inlet force to the stem that is greater than the sum of the outlet forces applied by the outlet pressure when the control element is in the closed position, thereby biasing the control element into the closed position.

27. The device of claim 26, wherein the control element further comprises a first O-ring sealingly engaging the bore in the valve insert.

28. The device of claim 27, wherein the first surface of the control element and at least a portion of the first O-ring define a first area of the control element and the second surface defines a second area of the control element, the first and second areas in communication with the outlet such that the outlet pressure applies substantially equal and substantially opposite forces to the control element when the control element is in the closed position.

29. The device of claim 27, wherein the control element further comprises a second O-ring disposed opposite the valve seat from the first O-ring, the second o-ring in fluid communication with the inlet when the control element is in the closed position and providing a seal between the control element and the valve body.

30. The device of claim 26, wherein the first surface of the control element generally faces the second surface of the control element.

31. The device of claim 26, wherein at least one of the first surface and the second surface comprises a frustoconically shaped surface.

32. The device of claim 26, further comprising a spring carred by the valve body and engaging the control element to bias the control element into the closed position.

* * * * *

UNITED STATES PATENT AND TRADEMARK OFFICE
CERTIFICATE OF CORRECTION

| | | |
|---|---|---|
| PATENT NO. | : 7,658,366 B2 | Page 1 of 1 |
| APPLICATION NO. | : 11/753273 | |
| DATED | : February 9, 2010 | |
| INVENTOR(S) | : Todd W. Larsen | |

It is certified that error appears in the above-identified patent and that said Letters Patent is hereby corrected as shown below:

In the Specification:

At Column 4, line 37, "embodiments" should be -- embodiment --.

At Column 4, line 40, "embodiments" should be -- embodiment --.

In the Claims:

At Column 16, line 46, "carred" should be -- carried --.

Signed and Sealed this

Twenty-fourth Day of August, 2010

David J. Kappos
*Director of the United States Patent and Trademark Office*